United States Patent [19]

Rogers et al.

[11] 4,234,037
[45] Nov. 18, 1980

[54] UNDERGROUND HEATING AND COOLING SYSTEM

[76] Inventors: Walter E. Rogers, Box 636, Lillington, N.C. 27546; Preston C. Midgett, Rte. 1, Box 522, Spring Lake, N.C. 28390

[21] Appl. No.: 879,232

[22] Filed: Feb. 21, 1978

[51] Int. Cl.³ .............................................. F24J 3/02
[52] U.S. Cl. .................................... 165/3; 126/400; 165/45; 237/1 R; 237/81
[58] Field of Search .............. 165/45, 104 S, DIG. 4, 165/106, 107, 1-3; 126/400; 62/260; 237/1 A, 1 R, 81

[56] References Cited

U.S. PATENT DOCUMENTS

| | | | |
|---|---|---|---|
| 1,974,244 | 9/1934 | Lapp | 165/45 |
| 2,007,406 | 7/1935 | Miller | 165/45 |
| 2,134,121 | 10/1938 | Harper | 165/45 |
| 2,210,960 | 8/1940 | St. Pierre | 165/45 |
| 3,127,936 | 4/1964 | Eurenius | 126/400 |
| 4,024,910 | 5/1977 | Werner | 165/45 |

FOREIGN PATENT DOCUMENTS

| | | | |
|---|---|---|---|
| 514673 | 12/1930 | Fed. Rep. of Germany | 165/45 |
| 2605953 | 8/1977 | Fed. Rep. of Germany | 165/45 |
| 248161 | 1/1948 | Switzerland | 165/45 |
| 582867 | 12/1976 | Switzerland | 165/45 |

Primary Examiner—Sheldon Richter
Attorney, Agent, or Firm—Mills & Coats

[57] ABSTRACT

The present invention relates to a heating and cooling system for structures such as residential dwellings. More particularly, the heating and cooling system includes one or more conduits disposed approximately six (6) feet underground and having opposite end extremities communicatively connected to the structure so as to define a closed air circulation system through the structure and one or more conduits. A fan assembly including appropriate controls is provided to induce and circulate air through the structure and through the one or more conduits such that a system of air may be continuously circulated from the structure through the underground disposed conduits and back through the structure. When the temperature of ambient air is significantly greater than or less than the temperature of the earth or ground around the conduits, a temperature gradient is established and the earth around and in the vicinity of the conduits becomes a medium of heat exchange relative to air passing through the one or more conduits. Thus, depending on the ambient air temperature, the system of the present invention will either heat or cool the structure. In a preferred embodiment of the present invention, there is provided in association with the conduits a water trap that enables water and condensation to be removed from the system of circulating air.

2 Claims, 4 Drawing Figures

UNDERGROUND HEATING AND COOLING SYSTEM

The present invention relates to heating and cooling, and more particularly to a heating and cooling system that utilizes the earth as a medium of heat exchange to either heat or cool a system of circulating air such that the circulating air may be utilized to either heat or cool an associated structure.

BACKGROUND OF THE INVENTION

In recent years, Americans and people all over the world have come to realize that traditional energy sources are limited. Energy sources in the form of gas, oil and coal have continued to increase in price and this increase in price has been passed on to the consumer.

As energy costs have risen, the cost of heating and cooling residential dwellings and other structures have increased accordingly. For example, in the last five years the cost of electricity that is utilized in some residential dwellings has increased as much as 40% in some areas. In the United States, people have been encouraged to reduce their energy use and to conserve as much energy as possible. In this regard, the area of heating and cooling residential dwellings and other structures has gained substantial attention. For example, home owners have been encouraged and advised to insulate their homes well and to install storm doors and windows in order to conserve more energy. While these steps are important to our national energy policy, they do not directly reduce the actual cost of energy being utilized.

There has been and continues to be a need to discover and utilize available natural sources of energy. In the past few years, a great deal of research has been directed in the area of solar energy utilization. It is agreed that solar energy is a source that offers an abundance of energy but there still remains the problem of being able to harness and utilize solar energy efficiently and practically. Commercial solar energy sources for residential dwellings and other structures are presently available, but these systems are expensive and in many cases their economic feasibility is still in question.

SUMMARY OF THE INVENTION

The present invention relates to a system for heating and cooling a residential dwelling or other structure, wherein the system utilizes the earth as a natural energy source and particularly provides for energy or heat exchange between the earth and a system of air being circulated through conduit means disposed underground, so as to heat or cool the passing air and accordingly to heat or cool the structure since the air is being circulated through the structure.

More particularly, the heating and cooling system of the present invention comprises conduit means preferably disposed approximately six feet underground and operatively connected about two extremities to a residential dwelling or other structure. The system is provided with fan means for inducing air from the structure through the conduit means. As air moves through the underground conduit means, to earth acts as a medium of heat exchange to either heat or cool the air passing through the conduit means. The heated or cooled air is circulated and directed from the underground conduit means into and through the associated structure so as to either heat or cool the structure, depending on the ambient temperature about the structure. Efficiency is maintained by providing a thermostatic control for the fan means such that the fan is only operable to circulate air through the underground conduit means when a sufficient exchange of heat can be achieved between the air and the earth. The system is provided with a water trap for removing water and condensation from the system of air being circulated through the structure and the underground conduit means.

It is therefore an object of the present invention to reduce the cost of heating or cooling a residential dwelling or other type structure.

More particularly, it is an object of the present invention to reduce the cost of heating and cooling a structure by utilizing the earth as a natural source of energy and as a medium of heat exchange by circulating a system of air from the structure through conduit means disposed underground to effectuate a heat exchange between the moving air and the earth, and to utilize the effect of such heat exchange to either heat or cool an associated structure.

Another object of the present invention is to provide an underground heating and cooling system for a structure that conserves energy by utilizing natural heat energy stored in the earth.

A further object of the present invention resides in the provision of an auxiliary heating and cooling system for a residential dwelling or structure that utilizes the earth as a source of energy and which accordingly will contribute to the heating and cooling of a structure and reduce the cost of operating a main or conventional heating and cooling system.

Another object of the present invention is to provide a natural energy source heating and cooling system for a residential dwelling or structure.

A further object of the present invention is to provide a natural energy source heating and cooling system that is functional, durable, and easy to maintain.

Another object of the present invention is to provide a heating and cooling system of the type described above that acts as a ventilating system to remove odors from the structure.

Other objects and advantages of the present invention will become apparent from a study of the following discription and the accompanying drawings which are merely illustrative of the present invention.

DESCRIPTION OF THE PREFERRED EMBODIMENT

Figure 1:
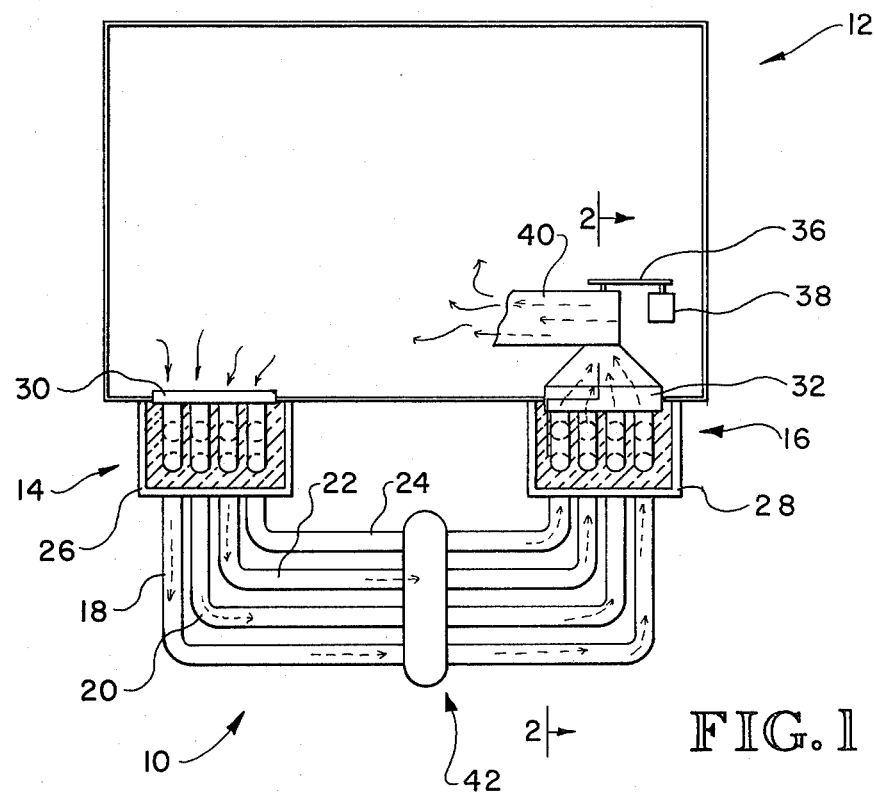
FIG. 1 is a plan diagrammatic view of the underground heating and cooling system of the present invention with the earth being removed from above the conduits to illustrate the relationship of such with respect to the entire system.

With further reference to the drawings, particularly FIG. 1, the underground heating and cooling system of the present invention is shown therein and indicated generally by the numeral 10. The underground heating and cooling system 10 is shown in conjunction with a structure, indicated generally by the numeral 12, and as will be more fully understood from subsequent portions of the disclosure, the underground heating and cooling system 10 is adapted under certain temperature conditions to heat or cool structure 12.

Viewing the underground heating and cooling system 10 in detail, it is seen that the same comprises a series of conduits, each pair indicated by numerals 18, 20, 22 and 24 and connected at two points to structure 12. In the embodiment illustrated, the heating and cooling system comprises Eight (8) conduits disposed in Four (4) sets with each set including an upper and lower underground conduit such as indicated by numerals 18a, 18b, 20a, 20b, 22a, 22b, 24a and 24b. The group of conduits are communicatively connected to structure 12 at an inlet or air return end indicated generally by the numeral 14 and particularly shown in FIG. 4. In this regard, about the inlet or air return end 14, there is provided a weatherproof enclosure 26 that extends around the conduits and into the ground. It is noted that the enclosure 26 could be of a double wall construction and accordingly is preferably insulated.

Figure 4:
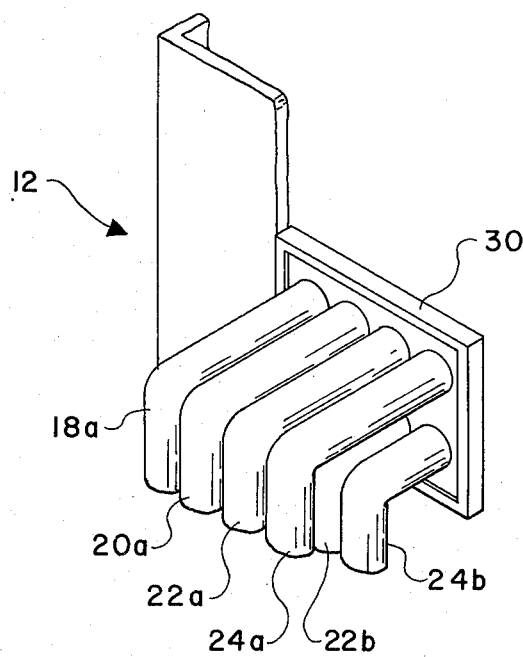
FIG. 4 is a fragmentary view of one end extremity of the conduit series where the conduits enter a manifold that enables the conduits to be communicatively connected to the structure.

Provided between structure 12 and the heating and cooling system 10 about the inlet air end 14, is an air filter frame assembly 30 that is adapted to contain and support an air filter (not shown). Each of the conduits, as illustrated in FIG. 4, is communicatively connected to the air filter frame assembly 30 and extends outwardly therefrom a relatively short distance at which point each conduit is elbowed so as to turn 90° towards the ground G. After the elbow, each conduit extends downwardly through enclosure 26 and through the open lower end thereof, into the ground G to a depth of approximately six (6) to ten (10) feet. Once this depth is reached, each conduit is then turned another 90° so as to extend generally horizontally through the ground G in a desired configuration adjacent the structure 12.

Disposed about another end extremity of the heating and cooling system 10 is an outlet end, indicated generally by the numeral 16, which joins the structure 12 and allows air being circulated through the system to be returned to the structure 12. Viewing outlet end 16 in detail, it is seen that the same includes a weatherproof enclosure 28 similar to enclosure 26, that generally encloses the end extremities of the conduits that are communicatively connected to the structure 12 about the outlet end of the system 10. Enclosure 28 is also preferably constructed of a double wall construction and insulated, and generally extends into the ground G to enclose the outlet end extremities of the conduits 18, 20, 22 and 24.

Figure 2:
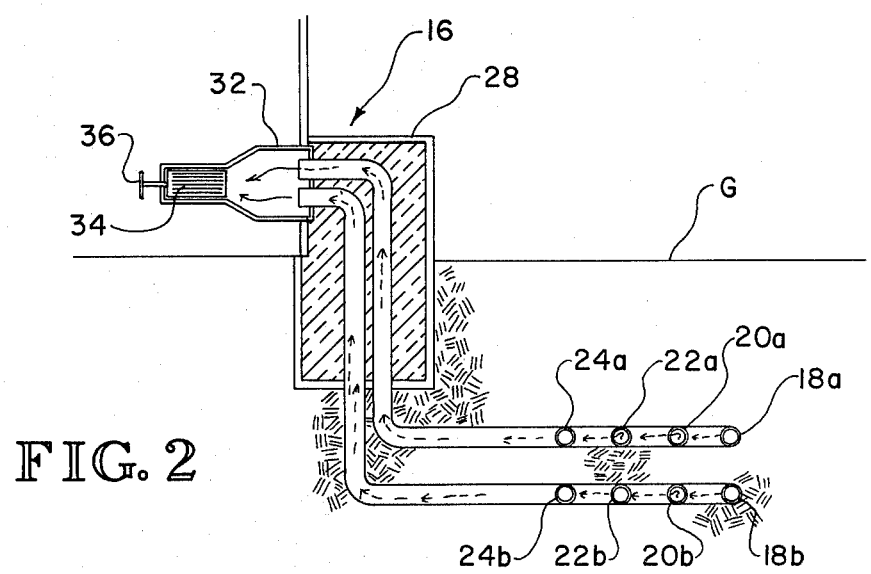
FIG. 2 is a fragmentary cross sectional view taken along the line 2—2 in FIG. 1.

Like the inlet end 14, the conduits about outlet end 16 are particularly turned at certain 90° angles as indicated in FIG. 2 so as to extend from the ground G to a manifold 32 that operatively connects the conduits to the structure 12.

Disposed within the manifold 32 is a squirrel cage fan 34 that can be typically powered by a ½ horsepower electric motor 38, or other suitable drive device, through a drive belt 36 as viewed in FIG. 1.

Communicatively connected to the manifold 32 is an air duct, indicated by the numeral 40 which is operative to direct air flow throughout the residential dwelling or structure 12. Consequently, then it is seen that the squirrel cage fan 34 is operative when driven to generate and maintain a system of circulating air from the structure through the conduits 18, 20, 22, and 24 and back into and through the structure. In operation, as will be understood from subsequent portions of this disclosure, the heating and cooling system 10 of the present invention is continuously operated to circulate air through the structure and through the ducts to effectuate either a cooling or heating of structure 12, depending on the ambient temperature conditions.

Figure 3:
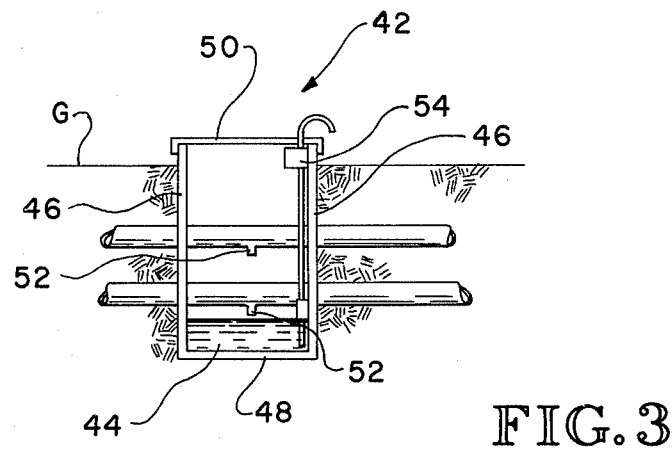
FIG. 3 is a cross sectional view illustrating the water trap that forms a part of the heating and cooling system of the present invention.

Heating and cooling system 10 is provided with a water trap, indicated generally by numeral 42 that is designed and adapted to remove water and condensation from the conduits and particularly from the system of air being circulated therethrough. Viewing the water trap 42 in detail, it is seen that the same includes a catch basin 44 disposed underground and extending transversely across the ground area occupied by the conduit such that the conduits extend through the basin 44. Basin 44 could be constructed of any suitable material, but it is contemplated it will be a concrete or a like structure. As shown in the preferred embodiment of FIG. 3, water trap 42 further includes walls 46, a bottom 48 and a closed top 50. Basin 44 is so constructed that the lower level of conduits are spaced above the bottom 48 in order that the bottom of the basin serves as a catch for water and condensation that may drain from the respective conduits. Therefore, each conduit is provided with a drain opening 52 along the length of the conduit within the basin 44, as illustrated in FIG. 3. The water trap 42 is provided with a sump pump 54 that includes an elongated inlet snout that extends downwardly into the basin to the bottom area thereof. Sump pump 54 is actuated by a level responsive float actuated switch that functions to actuate and cause the sump pump 54 to pump water or fluid from basin 44 once the water level reaches a predetermined height within the basin. Therefore, it is appreciated that this will keep water and other fluid pumped from the water trap 42, and will allow water and condensation in the conduits and in the system of air being passed therethrough to be removed from the air.

The conduits may be comprised of various material, but in the preferred embodiment of the present invention, the conduits are each comprised of a corrugated high density polyethylene plastic tubing. This particular material is both durable and relatively inexpensive. Typically, for a residential dwelling of 1,600 square feet of living area, eight four (4) inch diameter polyethylene pipes would be used with each pipe or conduit running approximately 100 feet underground. The number of conduits and the length underground would vary depending on the geographical location of the dwelling, the type of soil involved, and other pertinent variables, such as the effectiveness of the insulation of the particular structure involved.

As has already been pointed out, the conduits are disposed within the ground or earth, preferably at a depth of six (6) to ten (10) feet. It is interesting to note that at these depths, the temperature of the earth generally averages approximately 55° to 65° F. In a clay type soil at a six (6) to ten (10) foot depth, one can expect the temperature to be approximately 57° to 58° F. and may vary approximately 8° F. In sand, the sand at six (6) feet would generally average in a moderate climate about 60° F. but might vary approximately 8° to 10° F. above and below this average.

Therefore, in a case where the ambient temperature is very cold, for example 10° F., then it is appreciated that the heating and cooling system of the present invention can be of substantial value in heating and cooling a dwelling or structure 12. In such a case, heat energy in the soil surrounding the conduits is transferred to the conduits 18, 20, 22 and 24, and because of the excellent thermal conductivity of the polyethylene pipes, this heat energy is transferred to the passing air within the conduits. The net effect of this heat energy transfer from the ground to the passing air is that the total heat energy requirement from the main heating system of the dwelling or structure is reduced, and consequently the cost of heating is accordingly reduced.

Likewise, in an area where the ambient temperature is hot, for example 90° F., the heating and cooling system 10 of the present invention becomes an auxiliary cooling system for the structure 12. In this case, the air directed from the structure into the conduits would generally have a greater temperature than the temperature of the ground. Thus, as contrasted to the heating example set forth above, the temperature gradient would be reversed. That is, the heat energy of the passing air would be transferred to the conduits 18, 20, 22 and 24, and this heat would be transferred to the surrounding earth and ground. The net effect of this is that heat energy is removed from the passing air which makes the air cooler and the continuous circulation of the air through the structural dwelling 12 acts to cool the same and in so doing, the heat energy within the structure is being drawn therefrom and transferred to the earth and ground. Consequently, in this case, the heating and cooling system 10 of the present invention acts as a cooling system and can contribute to cooling the particular structure involved. This, again, will reduce, if not eliminate in some cases, the cooling requirements of the conventional cooling system being utilized by the structure, and therefore the cost of cooling or air conditioning is reduced.

In either heating and cooling, the heating and cooling system 10 of the present invention is preferably controlled through the squirrel cage fan 34 and associated electric motor 38. This can appropriately be done by a thermostatic controlled unit that would only drive the fan 34 and operate the heating and cooling system when the system would be efficient enough to at least offset the energy required to drive the fan. Details of such a thermostatic control unit are not shown herein, but such is well known and appreciated in the art and is commercially available. In operating the heating and cooling system 10 of the present invention, it is seen that air is pulled from the structure 12, through the air filter frame assembly 30 into the inlet end or return end 14 of the heating and cooling system 10. The air entering this end moves downwardly through the conduits 18, 20, 22 and 24 and on through the underground segments of the respective conduits. As the air so moves, there is effectuated a heat transfer or heat exchange between the air and the surrounding earth or ground, which would effectively heat or cool the structure 12 depending on the particular ambient conditions. As the squirrel cage fan 34 is continually driven, air is directed from the outlet end 16 of the heating and cooling system 10 into the manifold assembly 32 and through the squirrel cage fan 34 into a communicatively connected duct assembly 40. Once in the duct assembly 40 the air can be directed and routed throughout the duct structure of the dwelling into the individual areas and rooms of the structure 12. In the continuous operation of the fan unit 34, it then follows that air is being continually induced into the inlet end 14 of the heating and cooling system 10 and exhausted through outlet end 16 into the structure 12.

As already has been discussed above, it is seen that the water trap 42 would serve to remove water and condensation from the system of air and the conduits during the operation of the heating and cooling system 10 of the present invention. It should be pointed out that the heating and cooling system 10 has other advantages and other utility in addition to heating and cooling. In this regard, the continuous operation of the system 10 acts to remove odors from the structure and particularly is effective in removing obnoxious and other undesirable odors that might result from cooking certain foods. In addition, the system 10 as outlined and set forth herein, could be utilized in conjunction with a humidifier or other type of humidifying control units to control and maintain the humidity within the structure at a desired level.

From the foregoing specification, it is appreciated that the heating and cooling system 10 of the present invention can be utilized to heat or cool a structure in the manner set forth. In so doing, the cost of energy utilized for either heating or cooling would be reduced and energy would be conserved. Although, in certain situations and certain geographical locations, the heating and cooling system 10 would not be sufficient alone, it would nevertheless contribute substantially to heating and cooling and would therefore serve a useful and valuable function. In reality, the system could in certain geographical locations and under certain environmental conditions be self-sufficient in itself to cool a residential dwelling or other structure. Finally, the heating and cooling system 10 of the present invention is desirable because it is practical, relatively inexpensive, durable, and easy to maintain and is very simple in operation.

Term such as "upper", "lower", "forward", "rearward", etc., have been used herein merely for the convenience of the foregoing specification and in the appended claims to describe the underground heating and cooling system and its parts as oriented in the drawings. It is to be understood, however, that these terms are in no way limiting to the invention since the underground heating and cooling system may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

What is claimed is:

1. A method of heating or cooling a structure by utilizing the natural earth as a source of energy to heat and cool, due to the mean temperature lag phenomenon, comprising the steps of: circulating a generally closed system of air through said structure; directing the generally closed system of air from said structure into and through the ground to a depth of approximately five to ten feet; directing the generally closed system of air through elongated conduit means disposed underground and within the natural earth at a depth of generally between five and ten feet and wherein the elongated conduit means extend generally horizontal through the earth within said depth range of approximately five to ten feet deep over a substantial area of earth such that there is substantial surface area contact between said elongated conduit means and the natural earth; directing the air of said generally closed system through the elongated conduit means that extends generally horizontally through the natural earth within said depth range of approximately five to ten feet; effectuating a heat transfer between the air of said generally closed system of air and the natural earth lying adjacent said elongated conduit means such that the air is cooled when it is warmer than the adjacent earth and is heated when it is cooler than the adjacent earth; draining water and condensation from the elongated conduit means while said generally closed system of air is circulated through said elongated conduit means; directing the heated or cooled air of said generally closed system of air back to said structure for effectively heating or cooling said structure; and continuously circulating said generally closed system of air through said structure and through said elongated conduit means so as to continuously heat or cool said structure for a period of time.

2. A method as recited in claim 1 wherein said natural earth is the only source of energy utilized to heat or cool.

* * * * *